PULSE GENERATOR

Filed March 4, 1950 6 Sheets-Sheet 1

INVENTORS
GEORGE D. BUTLER,
SERGE A. LOUKOMSKY,
BY
Robert [signature]
ATTORNEY

Nov. 29, 1955 G. D. BUTLER ET AL 2,725,487

PULSE GENERATOR

Filed March 4, 1950

6 Sheets-Sheet 2

INVENTORS
GEORGE D. BUTLER,
SERGE A. LOUKOMSKY,
BY
Robert Cueshota
ATTORNEY

INVENTORS
GEORGE D. BUTLER,
SERGE A. LOUKOMSKY,
BY Robert Ames Norton
ATTORNEY

Nov. 29, 1955

G. D. BUTLER ET AL 2,725,487

PULSE GENERATOR

Filed March 4, 1950

6 Sheets-Sheet 4

INVENTORS
GEORGE D. BUTLER,
SERGE A. LOUKOMSKY,
BY
Robert [signature]
ATTORNEY

INVENTORS
GEORGE D. BUTLER,
SERGE A. LOUKOMSKY,
BY Robert Ames Norton
ATTORNEY

INVENTORS
GEORGE D. BUTLER,
SERGE A. LOUKOMSKY,
BY Robert Lines Motor
ATTORNEY

United States Patent Office 2,725,487

Patented Nov. 29, 1955

2,725,487

PULSE GENERATOR

George D. Butler, Ridgewood, and Serge A. Loukomsky, North Plainfield, N. J., assignors to American Cyanamid Company, New York, N. Y., a corporation of Maine Application March 4, 1950, Serial No. 147,722

3 Claims. (Cl. 250—209)

This invention relates to an optical-electrical integrator. More particularly the invention relates to a digital integrator for the integration of continuous functions by the discontinuous summation of selected ordinates.

There are many problems where the summation of discontinuous quantities is involved. Essentially, such integrations may be considered as a process in which areas under successive small arcs of the curve of the function to be integrated are represented by the curve ordinate at their center. Such types of integration permit the use of electronic digital counters with their inherent enormous speed. Examples of such problems are the calculation of integrated tristimulus values by selected ordinate methods.

When the discontinuous method of integration is used for the integration of the product of a fixed function by one changing for different integrations, a serious problem arises when the fixed function has sharp maxima. In such cases it is necessary to use a very large number of areas under very short arcs in these portions of the curve. This entails a very serious operating problem because if, as is practically always the case in actual integrations, ordinate values are represented by displacements or other physical quantities of a measuring machine, it is necessary to slow down the cycle of the machine very greatly.

It is, therefore, desirable to reduce the number of selected ordinates in some portions of the curve of the function to be integrated. In a more specific aspect of the present invention, which, for many problems is the preferred modification, this is effected by factorial weighting by an intermediate counting circuit, preferably, though not necessarily, of the standard binary flip-flop tube type. By factorial weighting of the ordinates in the steeper portions of a curve an excessive number and excessively close spacing may be avoided.

Selected ordinate integration, with or without factorial weighting, necessitates a pulse generating system with switching means and variable intervals during which pulses are generated. In the more specific modifications it also requires switching means in the weighting circuits. It is with the pulse generator and its associated switching and weighting means that the present invention is concerned.

According to the present invention, a disc having two slots at different distances from the center is continuously rotated. Two light beams and photoelectric devices are associated with the slots to effect starting and stopping of the counting of pulses. One of these light sources is rotatable about the axis of the disc and its position determines the number of pulsations between the starting and stopping slots. The angular displacement of the movable light source is controlled by the mechanical device measuring the ordinates of the function to be integrated. Where the preferred modification of factorially weighted ordinates is used, other devices, actuated by the ordinate relating mechanism, control switching in the flip-flop tube circuits.

Various generators for the actual pulses may be used.

In a preferred modification the rotating disc has a large number of transparent slots on its periphery aligned with a beam of light and photoelectric device, such as a phototube, which generates an electric pulse every time a transparent slot passes through the beam. This preferred method of generating pulses possesses a number of advantages which will be brought out more fully below. However, it is not necessary that the actual pulses be produced by combined optical and electrical means. It is quite possible to produce the pulses electronically by a suitable crystal-controlled oscillator, which may, for example, operate at approximately 1,000 kc., a suitable speed for counting circuits. It is then necessary that the disc be rotated at an accurate speed, which is a sub-multiple of the pulse frequency. This is easily effected by conventional frequency divider circuits which may, for example, produce a frequency of 50 cycles, which is then used to actuate a synchronous motor which drives the disc at a predetermined speed, for example, of the order of 1800 R. P. M.

The pulse generators of the present invention are cheaper to construct, rugged, and present a minimum of maintenance problems. An extremely important advantage lies in the fact that it is not in the least necessary that the disc be rotated in synchronism with any operation of the measuring machine. In the case of the preferred generator, in which the pulses are formed by combined optical and electrical means, it is not even necessary that the speed be constant over an extended period of time. It is only necessary that speed variations not occur in a time as short as a counting cycle, which will normally be of the magnitude of 1/40 or 1/50 of a second. Of course, the disc must turn at a reasonably fast speed so that a normal counting interval will be short compared to the change of the measuring machine as it generates an output proportional to the ordinates of the function to be integrated. The reason why synchronism is immaterial lies in the fact that the number of pulses which will be counted for any ordinate is determined purely by the angular displacement of the movable light beam and is independent of the rotational speed of the disc.

The present invention avoids all of the difficulties which have been encountered in ordinary pulse-generating circuits useful in counting devices. The counting interval magnitude and pulse frequency are automatically maintained in a fixed relation to each other and, in the preferred modification, pulse frequency can be varied and is immaterial to accuracy. Precision is dependent solely on the number of pulses for a maximum interval; in the preferred modification this means number of peripheral slots. It is easy to obtain minimum precision of the order of 1 part in 3,000 with a disc of 3–4 inch radius in the preferred modification and with disc rotational speeds of the order of 2700 R. P. M. In the case of a crystal-controlled, 100 kc. oscillator, the disc speed will be of the order of 1800 R. P. M. In the preferred modification larger discs will give even higher precision, but the minimum, referred to above, is adequate for most ordinary uses.

It is a further advantage of the present invention that the optical-electrical pulse generator may be used with standard electrical elements and circuits. For instance, a digital counter of the standard decade type as regularly sold on the open market may be used, and its use requires no modification. Even when the factorial weighting of the preferred circuit modification is employed, the flip-flop tube circuits are of standard design and involve no critical control of any elements.

Electronic circuits of extreme stability and reliability may be used. In the preferred modification, pulse frequency is immaterial, and even in other modifications it is only necessary that the ratio of pulse frequency and rotational speed be maintained constantly. This requires extremely simple and reliable circuits.

Another advantage of the invention is that none of the replaceable elements, such as phototubes or vacuum tubes, in the electronic circuits are in any sense critical. It is unnecessary to use matched elements, and there is no change in precision or reliability as an element, such as a phototube or a vacuum tube, ages; so long as the element operates at all, the pulse generator and associated circuits of the present invention will operate with full precision and reliability.

One of the most important fields for selected ordinate integration is in the calculation of tristimulus values for colors, using a conventional recording type spectrophotometer. Accordingly, in the specific description of a preferred embodiment of the present invention, it will be described in connection with the factorially weighted, selected ordinate integration of tristimulus values. It should be understood that the use of factorial weighting in the selected ordinate integration of tristimulus values is not our invention. This constitutes the subject matter of a copending application of Stearns and Loukomsky, Serial No. 147,721, filed March 4, 1950, now Patent 2,603,123 issued July 15, 1952. The pulse generating system of the present invention is eminently suited for use in the system of the Stearns and Loukomsky application, and is described therein as a preferred type of pulse generator. It should be understood, however, that the two inventions are unrelated, since the results of the Stearns and Loukomsky device may be obtained with any suitable pulse generator; and the pulse generating and counting system of the present invention may be used in any device for selected ordinate integration regardless of whether or not it involves spectrophotometric mechanisms.

The invention will be described in greater detail in connection with the drawings in which:

Fig. 1 illustrates the application of the pulse-generator and integrator to a standard type of recording flickering-beam spectrophotometer as described in the Pineo Patent 2,107,836. Since the spectrophotometer is of conventional design, only the portions directly cooperating with the pulse-generator, weighting and integrating means are shown in detail.

Figure 1:
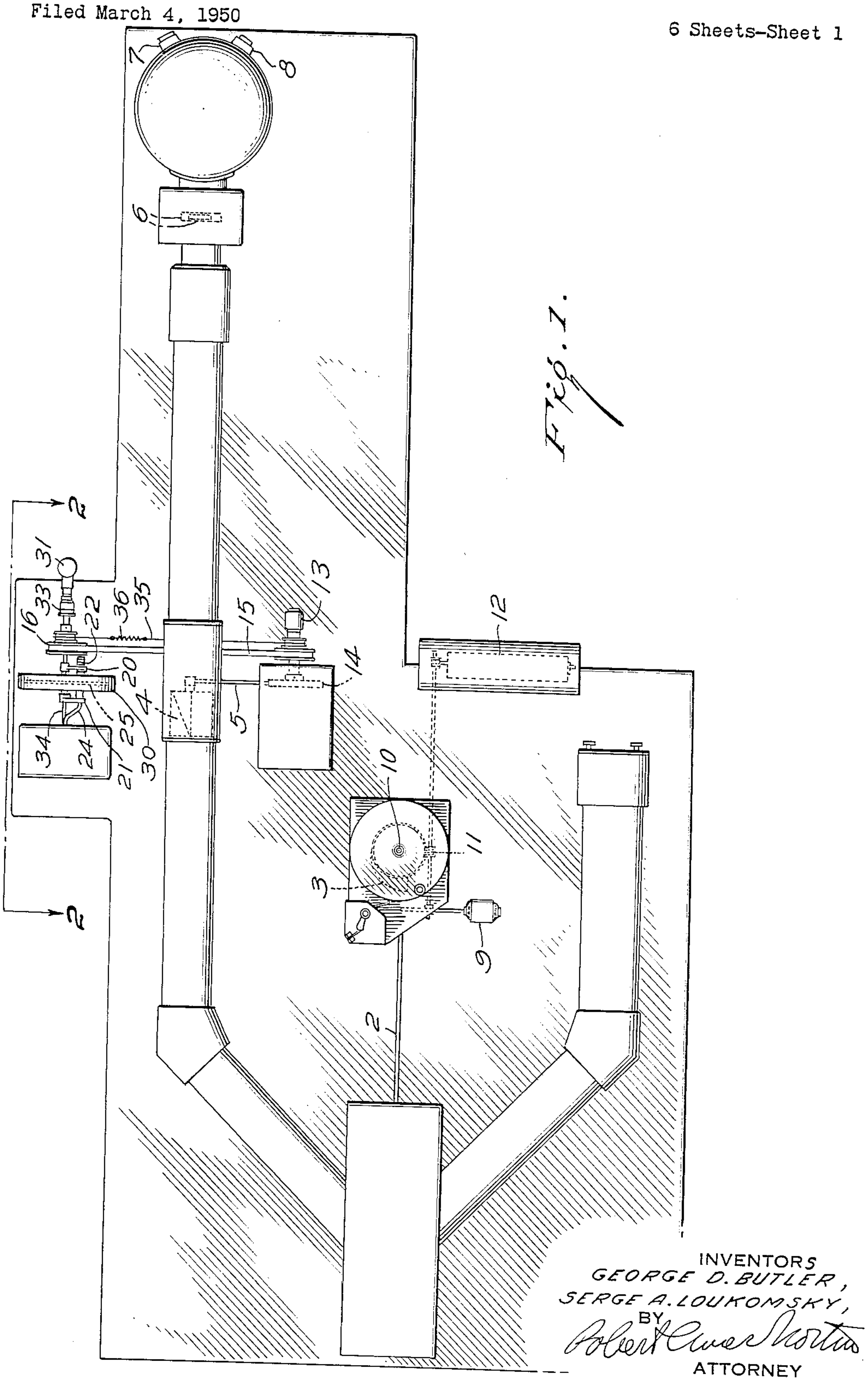
Fig. 1 is a semi-diagrammatic plan view of a flickering beam spectrophotometer, pulse generator and weighting system.

The conventional Van Cittert double monochromator of the spectrophotometer is shown at 1. The monochromator is operated in the usual manner by the wavelength-changing rod 2 engaging with one of the wavelength cams 3 on the shaft 10 driven by the motor 9 through gearing, which will be described below in connection with Fig. 4, and the worm 11. The same drive actuates the conventional recording drum 12 of the spectrophotometer.

The spectrophotometer operates in its customary manner, the monochromatic light from the monochromator passing through a photometering Rochon or Nichol prism 4, rotatable by the cam follower 5, which contacts a linear record cam 14. This cam provides shaft rotation proportional to the square of the tangent of the angle through which the photometering prism 4 is turned. The polarized beam is then split into two by the conventional Wollaston prisms, the two beams flickered in opposite phase in the usual manner, and passed through transmission sample holders 6 into an integrating sphere provided with reflectance sample holders 7 and 8. Unbalance of light in the integrating sphere at flicker frequency, due to differential transmission or reflectance of sample and standard, is then amplified in the usual manner by a high-gain flicker frequency amplifier (not shown), and actuates the photometering motor 13 to turn it in a direction to rotate cam 14, through high-reduction friction transmission, to rotate the photometering prism 4 so as to restore the total light in the integrating sphere to balance.

A steel tape on a pulley on the shaft of the cam 14 drives a corresponding pulley 16 in the pulse generator, the steel tape being kept taut at all times by the cable 35 and tightening spring 36. As a result the pulley 16 is rotated in proportion to changes in the percentage transmission or reflectance of the sample whose integrated tristimulus values are to be evaluated.

Figure 2:
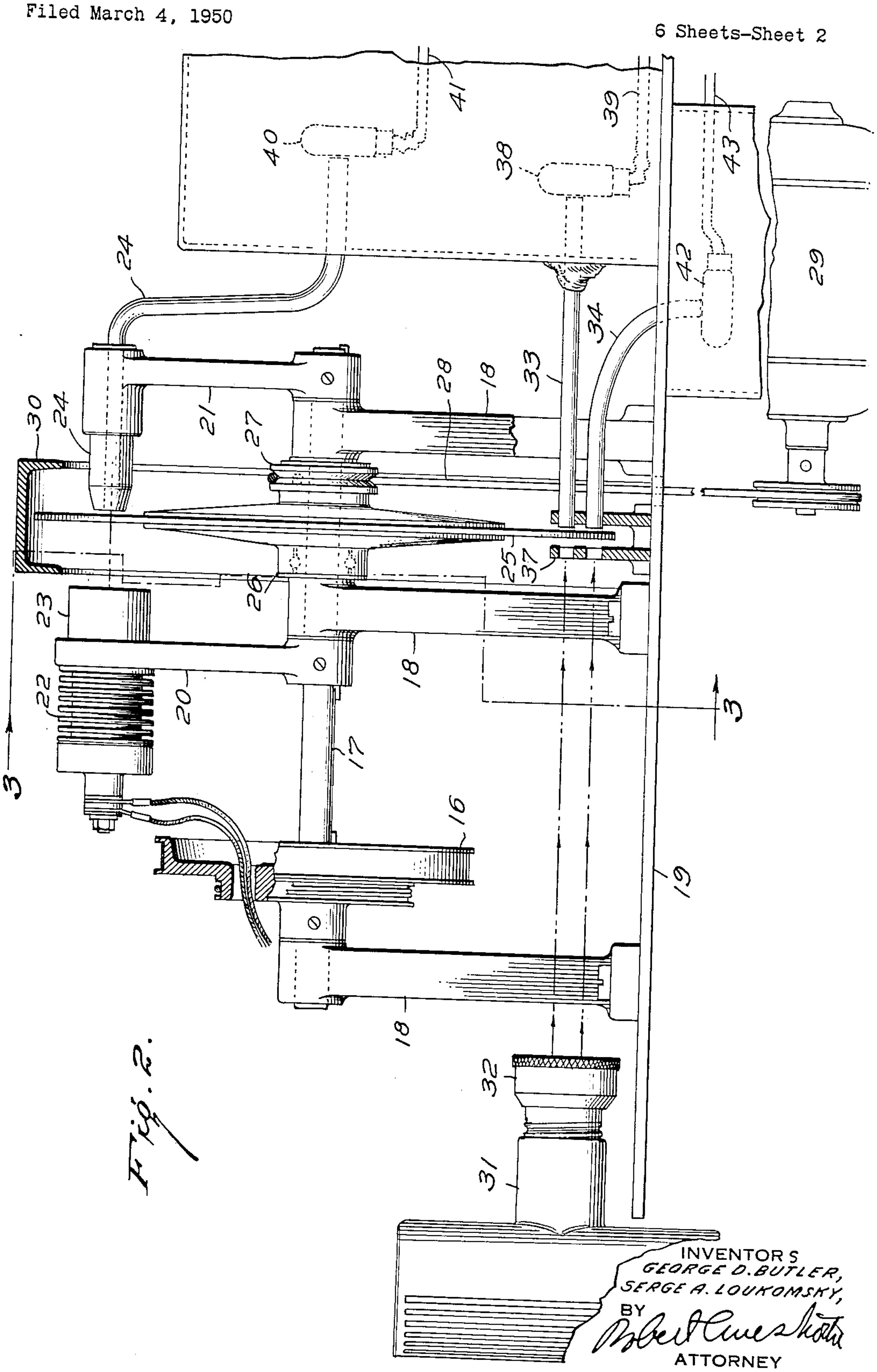
Fig. 2 is an enlarged vertical elevation of the pulse-generator, partly in section, along the line 2—2 of Fig. 1.
Figure 3:
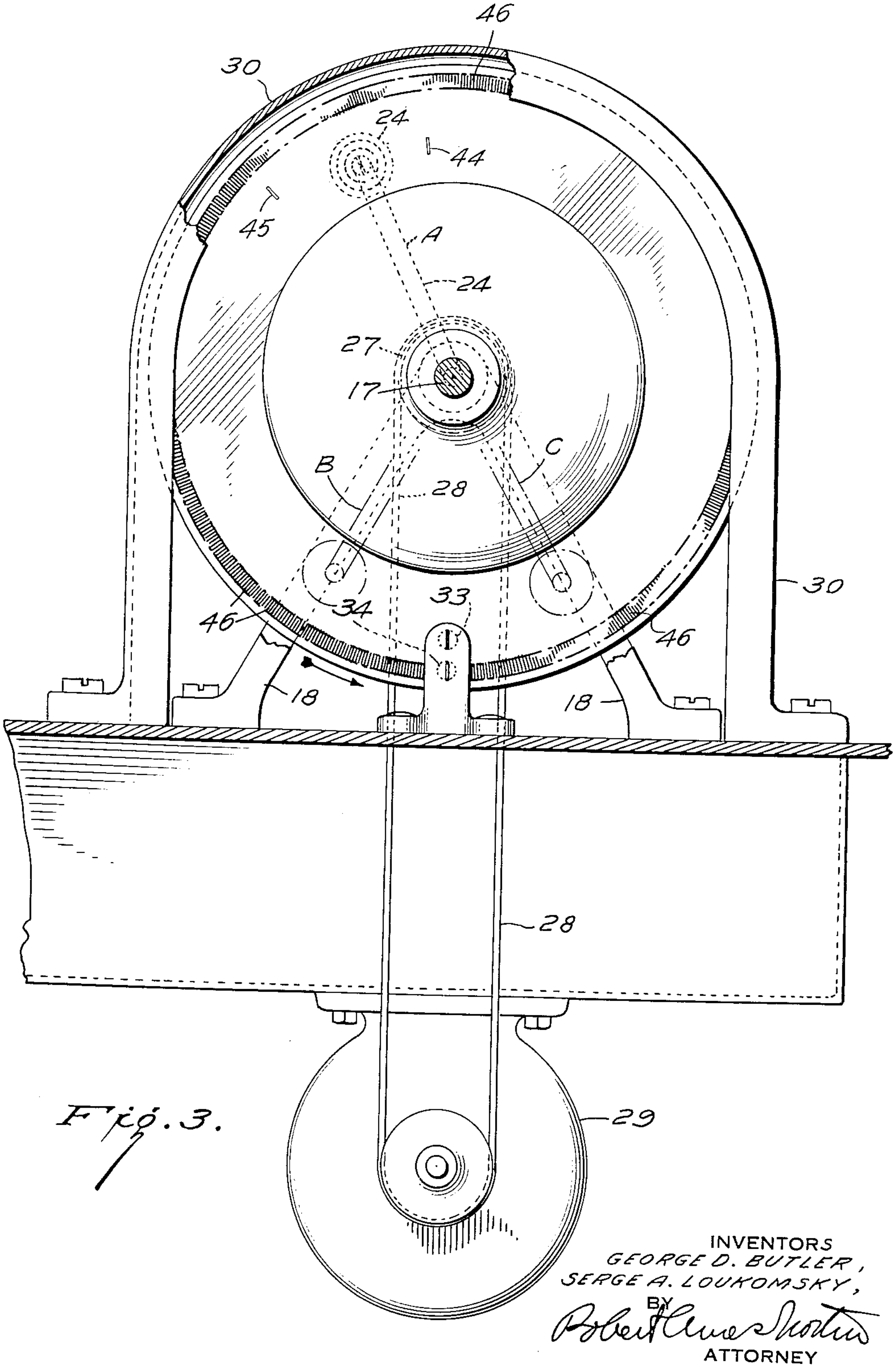
Fig. 3 is an enlarged end view, partly broken away, of the pulse-generator.

The pulse-generator of the present invention is a combined optical and electrical device, the optical portion being illustrated in enlarged detail in Figs. 2 and 3.

The pulley 16 is keyed onto a shaft 17 journalled in three supporting columns 18 on a framework 19. On this shaft there are keyed two parallel arms 20 and 21. The first carries a light source 22 and collimating lens 23; and the second a slot and a bent rod 24 of transparent methylmethacrylate resin. The rod enters the light-tight housing of the electrical portion of the device through a hole concentric with the shaft 17 and serves to lead light into said housing.

A second light source 31, with collimating lens 32, directs a parallel beam through two openings in one leg of a mask 37. In the corresponding opening in the other leg are two slots mounted on transparent methylmethacrylate plastic rods 33 and 34 also entering the housing of the electrical portion of the device. The three rods 24, 33 and 34 lead the light beams striking their faces to three phototubes 40, 38 and 42 respectively, from which output wires 41, 39 and 43 lead into the electronic portion of the device, which will be described below.

Between the right-hand supports 18 there is mounted on the shaft 17, in ball bearings, a hub 26 carrying a glass disc 25 which is rotated at a high, but not necessarily synchronous, speed of approximately 2700 R. P. M. The drive is through the pulley 27 and belt 28. A housing 30 surrounds the upper edge of the rotating disc.

The disc, which is cut from a photographic negative plate, is provided with a series of narrow, clear portions, or slots, 46 (Fig. 3), around its periphery. These slots, which are uniformly spaced, number 3600. Just inside the row of slots there is a single slot 45 which will be referred to as the stopping slot, and still nearer the center, a starting slot 44 displaced from the stopping slot by a predetermined angle, in the device illustrated, 30°. The rest of the disc is opaque, and its rotation is counter-clockwise as shown by the arrow along its periphery.

The arm 21 is shown in three positions, A, B and C, the first corresponding to a position for which the operation of the device will be described below, while B and C show the arm in the two extreme positions corresponding to zero transmission or reflectance of the spectrophotometer, or 100% respectively. In positions B and C the arm 21 is exactly 30° from the openings in the mask 37.

Flashes of light through the starting slot 44 start the electronic counting circuits as will be described below, and, as its name indicates, a flash of light through the stopping slot 45 stops counting. In the position A it will be seen that the starting slot 44 is almost opposite the end of the rod 24. As it passes, a pulse of light through the rod 24 is transformed into an electrical pulse by the phototube 40 and starts the counting circuits as will be described later. Then each flash through the rod 34, as the slots 46 pass in front of it, is transformed into an electrical pulse by the phototube 42 and is counted. When the stopping slot 45 passes in front of the rod 33, the resulting flash is transformed into an electrical pulse by the phototube 38 and stops the counting circuits.

It will be noted that the number of flashes from the slots 46 which are counted, is proportional to the angular position of the rod 24, that is to say, to the percentage transmission or reflectance measured by the spectrophotometer at a particular wavelength.

In the position B the starting flash and the stopping flash occur one right before the other. Zero reflectance or transmission is therefore represented by a single counted flash. In position C, corresponding to 100% reflectance or transmission, there will be 3,001 flashes counted.

In order to operate the machine, it is necessary that the ordinates be selected and that the proper weighting be given to each ordinate. This is effected by a splined, detachable sleeve 47 which slides down on the shaft 10 (see Fig. 4), the shaft being journalled in the mounting 57. The drive is by motor 9 through worm 59, worm wheel 49, worm 11 and worm wheel 58. The reduction is such that the shaft 10 makes somewhat less than a complete revolution in two minutes, which is the standard operating cycle of the spectrophotometer. The wavelength cams 3 determine the range of the spectrum through which the monochromator moves, and, for clarity, in Fig. 4 the rod 2, moved by the cams 3, is omitted.

The sleeve 47 carries seven cam discs 50 to 56, spacing being maintained by the spacers 48, which serve to make the whole assembly rigid. Engaging with the edges of each of the cam discs, are corresponding microswitches 60 to 66. From each switch emerges a pair of wires which will be designated for clarity by the number of the switch with the subscript "w." In other words, the wires from switch 60 will be designated $60_w$.

Disc 50 is the ordinate-selecting disc, and is provided with a series of notches 68 distributed non-uniformly around its periphery at the angular positions corresponding to the position of the shaft 10 at different wavelengths of the selected ordinates.

Figures 4, 5, 6:
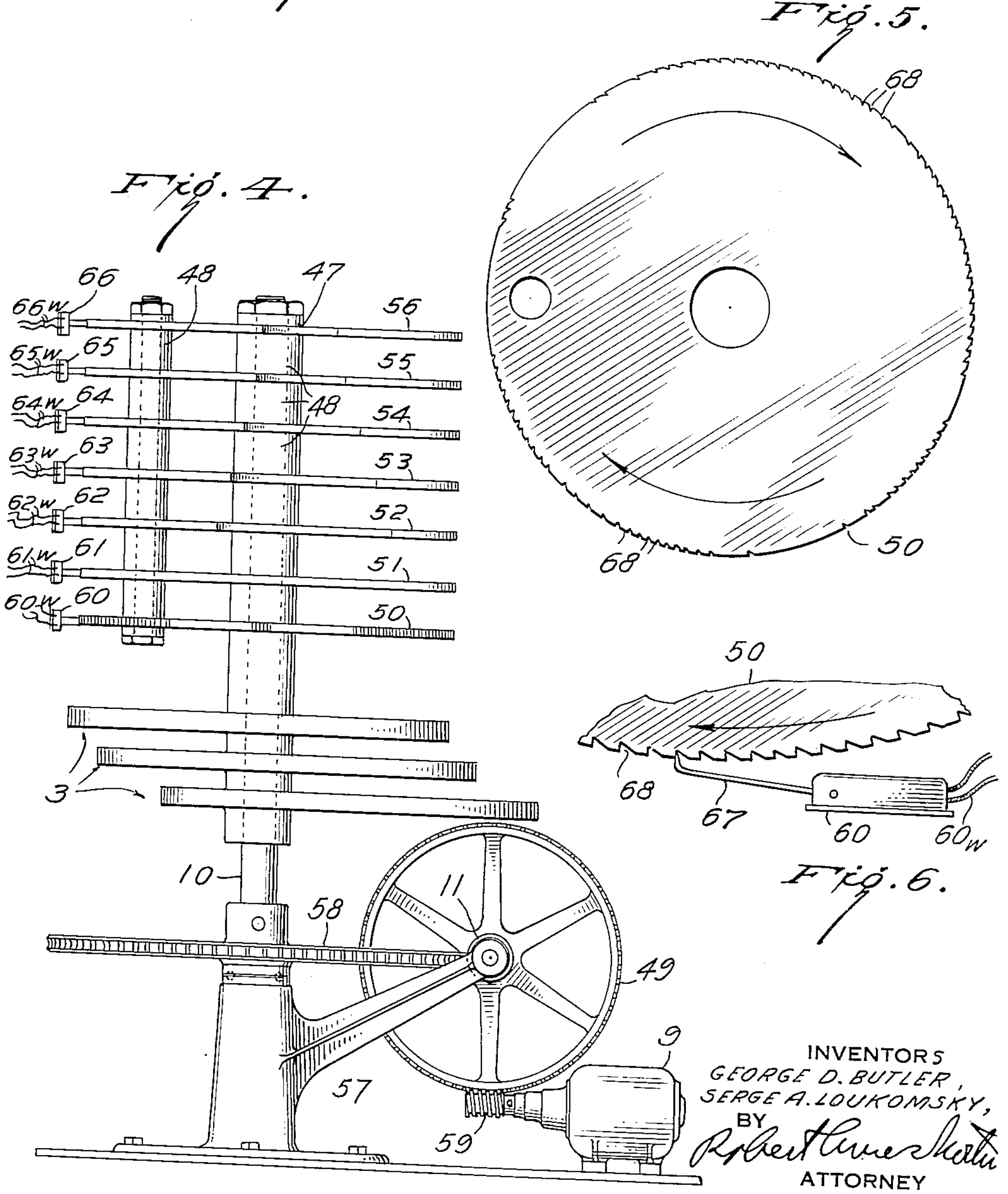
Fig. 4 is an enlarged detail elevation of the ordinate selecting and weighting means.
Fig. 5 is a plan view of the ordinate selecting cam.
Fig. 6 is an enlarged detail of a portion of the ordinate selecting cam and corresponding microswitch.

The microswitch 60 engaging the periphery of the disc 50 is provided with an actuating arm 67 (Fig. 6). This is a conventional design of microswitch and hence the actuating arms of the other microswitches 61 to 66, which are shown on Fig. 4, carry no reference numerals. They are of similar shape to 67.

When the arm 67 of the switch 60 drops into an ordinate-selecting notch 68, a circuit is closed through the wires $60_w$, which activates the electronic circuits of the counter and weighter so that they can respond to pulses from the starting, counting and stopping slots, only one for each closing of switch 60. This is necessary as the disc 25 makes more than one revolution between notches, and may make more than one revolution while switch 60 is closed.

Discs 51 to 56 correspond approximately to tristimulus X for daylight (illuminant C). Since a maximum weighting ratio of 1:16 suffices for this tristimulus, disc 51, which corresponds to a weighting of 1, does not have any indentations and therefore its microswitch is not actuated when the integral value of this tristimulus is being measured. The smallest weighting, a weighting of 2, is provided by disc 52 and as disc 56 provides for a weighting of 32, the ratio of 16:1 is maintained.

Figure 7:
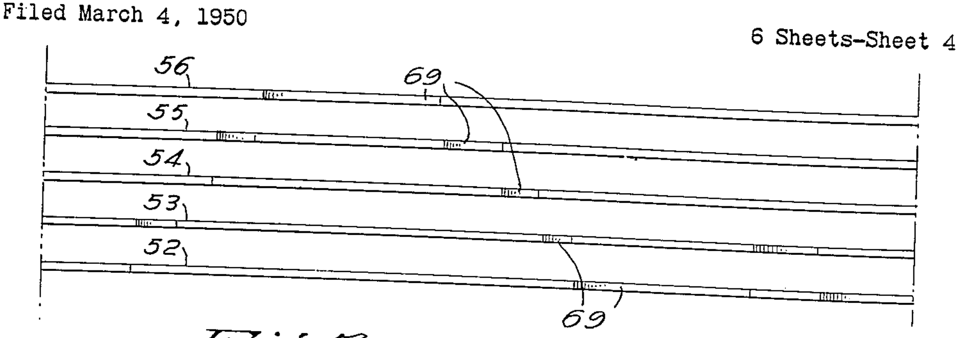
Fig. 7 is a developed surface of the edges of five of the weighting cams.

Fig. 7 shows the peripheral surfaces of discs 52 to 56 rolled out in a straight line. Disc 51 is not shown as it has a smooth surface. It will be noted that the indentations 69 give various weights for different groups of selected ordinates, disc 51 corresponding to a weighting of 1, 52 to 2, 53 to 4, etc. It will also be noted that the areas in the spectrum where the same weighting is employed, correspond roughly to the curve of the tristimulus function, the surface reading increasing in frequency from left to right because of the direction of rotation of the discs, which is the opposite of the conventional representation of spectral curves.

Figure 8:
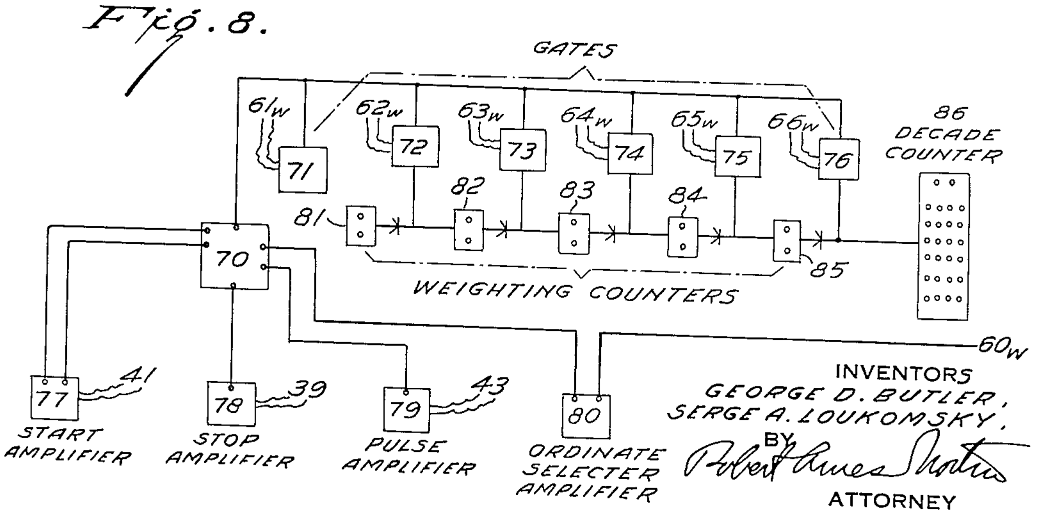
Fig. 8 is a diagrammatic representation of the electronic circuits of the pulse-generator, weighting and counting devices.

The operation of the electrical pulse-generator weighting and counting circuits will be described in connection with Fig. 8, which is a block diagram, as the electronic circuits consist of known elements. Pulses from the starting phototube 40 are carried through wires 41 to a pulse amplifier and shaper 77 of conventional design. In a similar manner, the stop pulses from phototube 38 are carried through wires 39 to the pulse shaper and an amplifier 78, and the pulses from the counting phototube 42 through wires 43 to the amplifier 79. A gating circuit 70 has a circuit activating the gate, which circuit is actuated through wires $60_w$ and amplifier 80. The output of the amplifier 77 is then able to open the gating circuit so that the pulses from amplifier 79 pass through. The circuit is inactivated by a pulse from amplifier 78, which re-sets it so that it is necessary for it to receive first a pulse through wires $60_w$, and then from the amplifier 77, before it again opens. The counting pulses pass to the gating circuits 71 to 76, which are actuated by the closing of microswitches 61 to 67 respectively. These gating circuits lead into the inputs of binary flip-flop tube circuits 81 to 85 serving as weighting counters and direct to the input of the six-decade digital counter 86 respectively. When microswitch 61 is closed, the pulses passing through the gating circuit 70 are impressed on the input circuit of the first flip-flop tube circuit 81. They are counted through the five flip-flop circuits, and then into the digital counter. In other words, there is a pulse in the input of the digital counter for every thirty-two pulses in the input circuit of the first flip-flop tube circuit 81. If a different weight is called for for a particular ordinate, for example a weight of eight, a depression in the disc 54 engages with the actuating arm 64, and the counting pulses are then applied directly to the input circuit of flip-flop tube 84. In this case there will be a pulse in the input of the digital counter for every four pulses. Where a weighting ratio of 32:1 is required, as in the case of the Z tri-stimulus for illuminant A, there will be a depression on the disc 51, which will actuate the microswitch 66 and the gating circuit 71 so that the counting pulses will be applied to the first weighting counter 84.

The operation of the gating circuit 70 will be described in connection with Fig. 9 which is a schematic diagram of the essential elements thereof. The gating circuit consists of two pairs of flip-flop tubes 87 and 88, and 89 and 90. The flip-flop tubes are connected to a source of B+ voltage in the usual manner through plate resistors 91—94, the last one being tapped and connected to the cathode of a diode 95. The plate ends of the resistors 91—94 are connected in the usual manner to the grids of the opposite tube of each pair through the conventional RC circuits. The grids are provided with grid resistors, and the cathodes of each pair are connected to ground through the usual by-passed bias resistors. One of the wires $60_w$ from the output of a trigger actuated by the ordinate selector is connected to the plate end of the resistor 91, and the outputs of the start and stop amplifiers 77 and 78 are connected respectively to the plate ends of the resistors 93 and 94. The latter point is also connected through two resistors in series to a source of 20–30 volts negative bias. The junction point of the two resistors is connected to the grid of tube 96, which furnishes voltage for a gating circuit connecting the pulse amplifier 79 to the weighting-gating circuits 71 to 76. The plate end of resistor 92 is connected to the plate of the diode 95 and through two resistors in series to the negative 30-volt biasing voltage source. The junction of the two resistors is connected to the grid of a cathode follower tube 97, the cathode of which is connected to the cathode of a diode 98, the plate of which is connected to the grid of the last stage of amplifier 77.

All pulses actuating the gating circuits are negative pulses. In its normal condition, triodes 88 and 90 are conducting, and triodes 87 and 89 are biased to cut-off. In this condition the voltage at the plate end of resistor 92 is low and, accordingly, triode 97 is not conducting, and therefore its cathode, and hence the cathode of diode 98, is at ground potential. This diode effectively short-circuits the signal to the last stage of amplifier 77, and no start pulses are present in the output of this amplifier. Also, cathode follower 96 is at cut-off and no positive gating voltage is available.

When the microswitch 60 drops into a notch on the disc 50, a negative pulse is applied by the amplifier 80 to the plate end of resistor 91 and through the RC circuit to the grid of tube 88. The latter is flipped to the non-conducting position, and the resulting high voltage from the plate end of resistor 92 starts the tube 87 conducting, the resultant low voltage at the plate end of the resistor 91 maintaining the grid of tube 88 biased to cut-off. The high voltage from the plate end of resistor 92 overcomes the bias on the tube 97, which starts to conduct, raising the voltage of the cathode of the tube 98 so that the latter ceases conducting, and the output stage of amplifier 77 is therefore no longer short-circuited. The diode 95 begins to conduct since its anode is at higher potential than the cathode but the positive pulse applied to the tap of resistor 94 is insufficient to start tube 89 conducting. The tubes 89 and 90 are now set for response to starting and stopping pulses. When the starting slot in the disc registers with the starting beam, a negative pulse is delivered to the plate end of the resistor 93 and thence to the grid of the tube 90. The latter flips to the non-conducting position, tube 89 conducting. The plate end of resistor 94 is now at high potential which overcomes the cut-off bias on tube 96, a corresponding positive voltage being impressed from its cathode to the gate circuit for the pulse amplifier 79, unlocking the latter in the conventional manner and permitting pulses from the amplifier 79 to reach the gating circuits 71–76, one of them being energized by the weight selector cams 51—56 so that the gate for the proper weighting is opened. Pulses from amplifier 79 are counted by the digital counter through the weighting circuit chosen. Diode 95 stops conducting when tube 90 becomes non-conducting, resulting in a positive pulse at the plate end of resistor 92, which also acts on the grid of the conducting tube 87 and hence does not flop the pair 87, 88.

When the stop slot in the disc registers with the stopping beam, a negative pulse is applied from the amplifier 78 to the plate end of resistor 94 and thence to the grid of tube 89. The tubes then flop back to their original state with the tube 90 conducting and tube 89 biased to cut-off. The lower voltage in resistor 94 permits the diode 95 to conduct, thus applying a negative pulse to the grid of the tube 87, causing this pair of tubes to flop to the original position; at the same time, tube 97 is biased to cut-off, diode 98 begins to conduct, and the starting amplifier 77 is short-circuited. The low voltage at the plate end of resistor 94 also results in biasing the tube 96 to cut-off, which closes the gate to the weighting and counting circuit. Succeeding stop pulses have no effect on the system because the tubes 89 and 90 are already in the flopped position, which results from a stop pulse.

It will be apparent that every ordinate on the disc 50 corresponds to a particular position in the spectrum. The transmission or reflectance measured by the spectrophotometer will determine the angular position of the rod 24 and hence the number of light pulses impressed on the phototube 42 between start and stop. At the same time, one of the weighting discs, through its microswitch, will connect the pulses to the proper portion of the weighting circuit so that the number of pulses will be given the proper weight. For the usual two-minute cycle of the spectrophotometer, the number of pulses counted are well within the 135 kc. response of the digital counter and weighting circuits, and at the end of the cycle the decade counter will give a number corresponding to the integrated tristimulus value of the particular tristimulus for a particular illuminant. Another set of discs for the next tristimulus are then slipped onto the shaft 10, and the operation repeated until the integrated values for all three tristimuli are obtained. If it is desired to obtain the integrated tristimulus values for another illuminant, the cycle is repeated three times with sets of discs for the tristimuli for the second illuminant.

Figure 10:
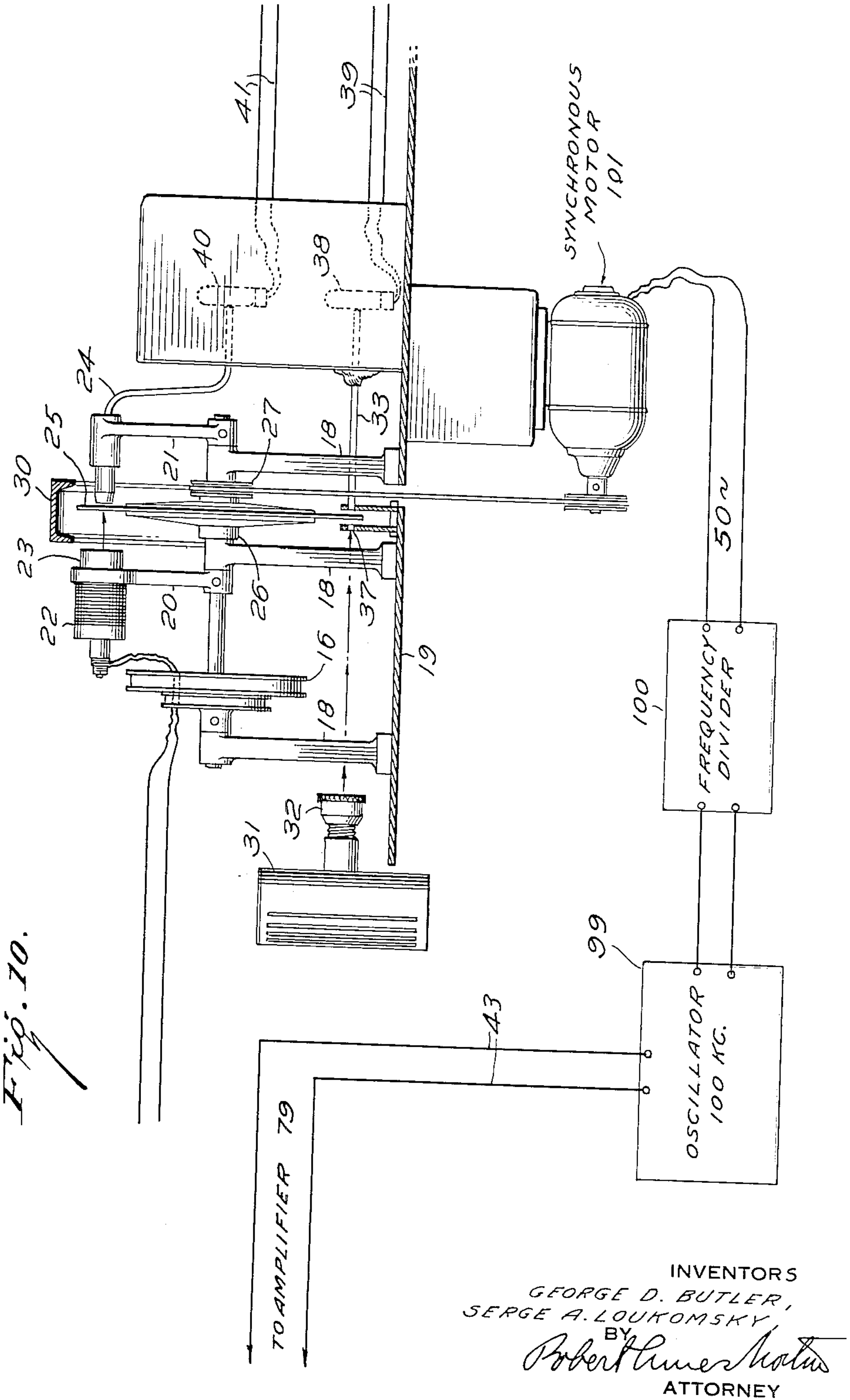
Fig. 10 is a diagrammatic representation of a modified pulse generator in which the pulses are generated electronically.

Fig. 10 illustrates a modified pulse-generator in which the pulses are generated electronically. Elements common to the other figures are given the same reference numerals. The disc 25 is provided only with starting and stopping slots 44 and 45, and only the light beams and photoelectric elements operating with the starting and stopping slots are included. Pulses are generated by the crystal-controlled oscillator 99, of conventional design, which may, for example, operate at 100 kc. These pulses are fed to the pulse amplifier 79. The sine wave of the oscillator is shaped by the amplifier. A pulse of 100 kc. signal is fed through a frequency divider 100, producing a sub-multiple frequency of 50 cycles, which operates the two-phase synchronous motor 101 to drive the disc at about 1800 R. P. M. in constant proportion to the oscillator frequency. The frequency divider includes conventional amplifier and phase-splitting circuits to produce a two-phase output of sufficient power to operate motor 101.

The operation of the device is exactly the same as the preferred modification shown in the preceding figures. Here, as there, the number of pulses is determined solely by the angular displacement of one of the light sources and its associated photoelectric device, in the figure the starting light source 22 and the bent rod 24 carrying a slot at its end. The number of pulses for a maximum displacement is still 3,001, and the accuracy of the device is in no way dependent upon an absolutely unchanging oscillator frequency. Even if this frequency changes slightly, for example by temperature changes which affect the crystal frequency, there is no change in precision for the frequency divider always causes the disc to rotate at a speed proportioned to the oscillator frequency. As the latter increases, the speed of rotation increases in proportion and vice versa.

In the preferred modification, the pulse frequency is always the same constant multiple of the disc R. P. M., and the ratio can not be changed because it is inherent in the structure of the disc. In the case of the modified pulse-generator illustrated in Fig. 10, however, the relation between frequency and disc R. P. M. can be varied. For example, conventional switching in the frequency divider can change the frequency supplied to the motor 101. For any given setting of the switch, however, the ratio is constant. The frequency will be referred to in the claims as a "predetermined constant multiple of disc rotation."

Frequency dividers often divide the frequency factorially and in such a case the frequency divider may be used in place of weighting counters in order to give different weights to different ordinates for uses such as are described in the present specification where fractorial weighting is employed. Even though the ratio of frequency to disc rotation may be changed during a particular measurement, it is always constant for any one cycle, and all of the advantages of precision and accuracy are retained regardless of whether the predetermined constant ratio exists for the whole of a measurement or for one or more ordinates.

In the specific modifications described, the starting light beam and light conducting rod are shown as movable. Exactly the same results are obtained if the stopping beam is made movable and the starting beam fixed, the respective slots, of course, being located in the correct angular relations. It would, of course, also be possible to have both beams movable but for most operations in which a single physical quantity proportional to the ordinate, such as displacement, is generated by the measuring machine, it is only necessary to have one of the two movable. Where, however, two quantities are produced by a measuring device and it is desired to integrate by the selected ordinate method a differential between the two quantities, such, for example, as their arithmetic difference, one quantity can move the starting light beam and the other the stopping light beam. In other words, the angular portion of one or both starting and stopping beams may be controlled by the output of one or more measuring devices. The sum of the pulse generated is always directly proportional to the angle between the two light beams minus the angle between the start and stop slots on the rotating wheel.

The spinning disc may be of any suitable material and the slots may be transparent portions or they may be cut out. The preferred construction is by photographic means, the peripheral slots being drawn in India ink on a large circle, for example four feet in diameter. This is then photographed onto a glass plate so that the circle is of the desired radius. The black slots appear on the negative as clear glass, and the plate is then cut to form a circular disc and fastened at its center onto a suitable hub. The photographic method of construction is not only cheap and reliable for a single device, but permits the production of an unlimited number of discs from a single drawing.

The pulse-generator of the present invention has been shown in connection with digital counting circuits. This is its most important field. However, in its broader aspects, it is not limited to a counting or integrating device, for the series of variable timed bursts of pulses can be used for any purpose where such a signal is desirable. Accordingly, the invention is not limited in its broader aspects to combination of the pulse generator with electronic mounting circuits. In a preferred modification, however, such a combination is included as it constitutes the most important field of utility for the present invention.

Figure 9:
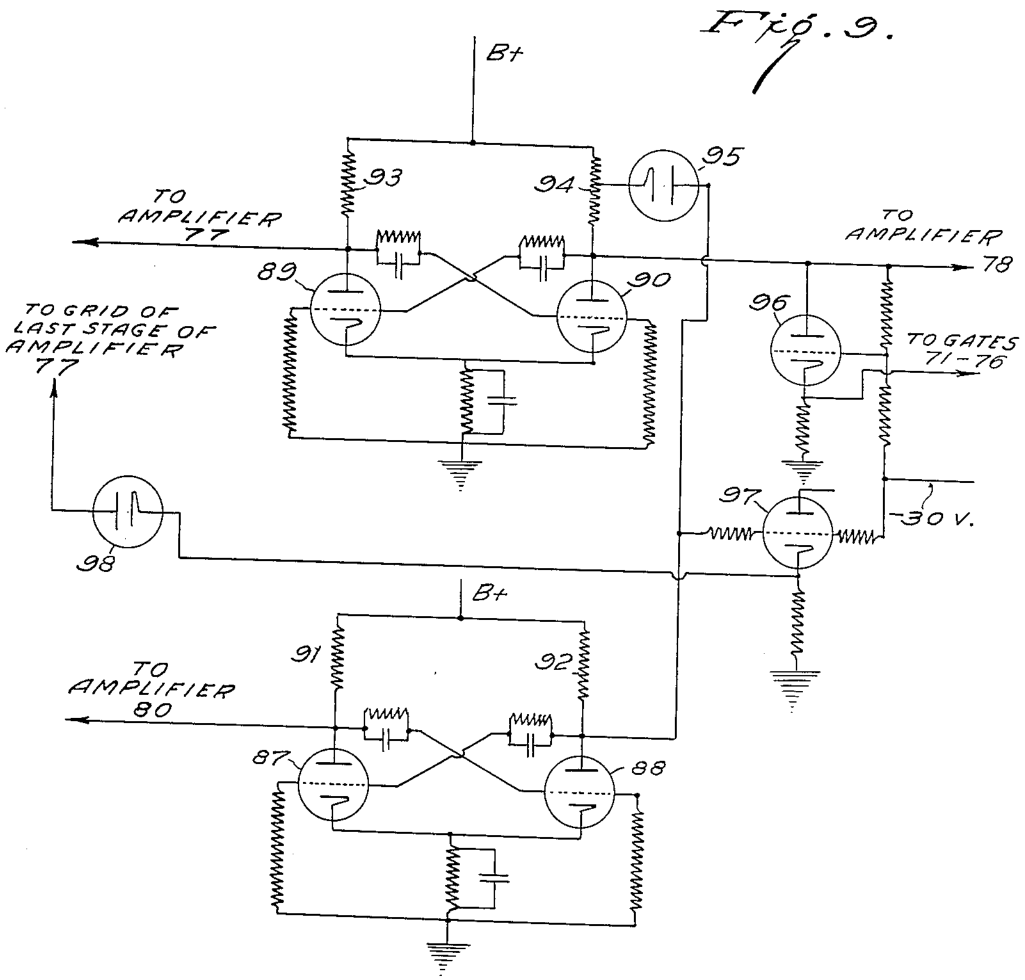
Fig. 9 is a schematic diagram of the gating circuit.

In the specification reference is frequently made to "gating circuits." It will be noted that these gating circuits do not necessarily all operate by the same electronic principle, and this is well illustrated by Fig. 9. Most of the gating is effected by the very common method of biasing a tube in a circuit to cut-off. There are, however, other well-known methods of negativing a circuit, one of which is illustrated by the diode 98 which absorbs the signal in a stage of the amplifier to which it belongs thus effectively short-circuiting the stage for certain types of signals. It should therefore be understood that in referring to gating circuits in the specification and claims it is not intended to limit them to those in which circuits are activated and inactivated by grid bias changes.

We claim:

1. A pulse-generator comprising a rotatable disc having two single slots at different distances from the center; means for rotating the disc, means for generating electrical pulses at a frequency which is a preselected constant multiple of disc rotation; means for generating two light beams at right angles to the rotatable disc, one of said beams being spaced from the center of rotation of the disc a distance equal to that of one of the single slots so that it registers with one of the single slots at one angular position in the rotation of the disc and the other beam generating means being spaced from the center of rotation of the disc so that the beam produced registers with the other slot when it passes the beam; means for directing the light from each of the beams after passing through the respective slots onto photoelectric devices; means for moving in a circle concentric with the axis of rotation of the rotatable disc the beam generating and beam directing means of at least one of the beams, said means moving the beam generating and beam directing means in unison; a gating circuit connected to the pulse generating means and actuated by the output of the photoelectric devices capable of starting and stopping transmission of the electrical pulses.

2. A pulse-generator according to claim 1 in which the means for generating electrical pulses is a large number of transparent slots around the periphery of the disc, and means for generating a light beam striking the peripheral slots, and means for directing said beam after passing through said slots, onto a photoelectric device.

3. A device according to claim 1 in which the means for generating electrical pulses is an electronic oscillator and pulse-shaping amplifier, means for rotating the disc is a synchronous motor and a portion of the oscillator signal is connected through a frequency divider to actuate the motor.

References Cited in the file of this patent

UNITED STATES PATENTS

| | | |
|---|---|---|
| 1,680,756 | Winter | Aug. 14, 1928 |
| 1,799,134 | Hardy | Mar. 31, 1931 |
| 1,916,356 | Bohner | July 4, 1933 |
| 2,071,284 | Hyland | Feb. 16, 1937 |
| 2,086,157 | Dumble | July 6, 1937 |
| 2,108,097 | Bedford | Feb. 15, 1938 |
| 2,309,117 | John | Jan. 26, 1943 |
| 2,348,862 | Sorkin | May 16, 1944 |
| 2,436,104 | Fisher et al. | Feb. 17, 1948 |
| 2,502,319 | Golay | Mar. 28, 1950 |
| 2,603,123 | Loukomsky et al. | July 15, 1952 |